United States Patent
Jordil

(10) Patent No.: US 10,175,035 B2
(45) Date of Patent: Jan. 8, 2019

(54) SCARA STRUCTURED COORDINATE MEASURING MACHINE WITH BELT DRIVE GUIDED PROBE HEAD

(71) Applicant: HEXAGON TECHNOLOGY CENTER GMBH, Heerbrugg (CH)

(72) Inventor: Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 55 days.

(21) Appl. No.: 15/227,858

(22) Filed: Aug. 3, 2016

(65) Prior Publication Data

US 2017/0038189 A1 Feb. 9, 2017

(30) Foreign Application Priority Data

Aug. 3, 2015 (EP) ..................................... 15179579

(51) Int. Cl.
*G01B 5/008* (2006.01)
*G01B 21/04* (2006.01)
(Continued)

(52) U.S. Cl.
CPC .............. *G01B 5/008* (2013.01); *B25J 9/104* (2013.01); *B25J 9/1035* (2013.01); *B25J 9/126* (2013.01);
(Continued)

(58) Field of Classification Search
CPC ........ G01B 5/008; G01B 21/04; B25J 9/1615; B25J 9/104; B25J 15/0019; B25J 9/126; B25J 9/1035; Y10S 901/21
(Continued)

(56) References Cited

U.S. PATENT DOCUMENTS

| 3,566,479 | A | * | 3/1971 | Pascoe et al. | ......... | G01B 7/008 |
| | | | | | | 33/23.11 |
| 3,952,984 | A | * | 4/1976 | Dimitry | ................. | H01Q 1/125 |
| | | | | | | 248/282.1 |

(Continued)

FOREIGN PATENT DOCUMENTS

CN 101024286 A 8/2007
CN 201615752 U 10/2010
(Continued)

OTHER PUBLICATIONS

European Search Report dated Nov. 3, 2015 as received in Application No. 15179579.6.

*Primary Examiner* — R. A. Smith
*Assistant Examiner* — Tania Courson
(74) *Attorney, Agent, or Firm* — Maschoff Brennan

(57) ABSTRACT

The invention relates to a coordinate-measuring machine for determining at least one spatial coordinate of a measurement point on a measuring object, comprising a base, a carrier comprising at least one carrier segment, a proximal end of the carrier being mounted pivotably about a base axis in the base, a measuring probe being arranged on a distal end of the carrier, and an angle measuring system for determining pivot angles of the at least one carrier segment, and/or rotation angles of the measuring probe, wherein at least one belt drive comprising a base pulley being arranged in the base, at least one follower pulley being arranged on at least one carrier segment, and at least one belt binding the rotatory behavior of said pulleys.

17 Claims, 13 Drawing Sheets

(51) Int. Cl.
*B25J 9/10* (2006.01)
*B25J 9/12* (2006.01)
*B25J 9/16* (2006.01)
*B25J 15/00* (2006.01)

(52) U.S. Cl.
CPC ......... *B25J 9/1615* (2013.01); *B25J 15/0019* (2013.01); *G01B 21/04* (2013.01); *Y10S 901/21* (2013.01)

(58) Field of Classification Search
USPC ................. 33/502–503, 550–551, 553–554, 33/556–557, 560
See application file for complete search history.

(56) References Cited

U.S. PATENT DOCUMENTS

| | | | | |
|---|---|---|---|---|
| 4,887,360 A * | 12/1989 | Hemmelgarn | ......... | G01B 5/008 33/1 M |
| 4,889,519 A * | 12/1989 | Band | .................... | G01B 5/0002 474/101 |
| 4,897,015 A * | 1/1990 | Abbe | ....................... | B25J 9/042 414/744.8 |
| 4,928,396 A * | 5/1990 | Raleigh | .................. | B23Q 5/385 33/1 M |
| 4,964,221 A * | 10/1990 | Breyer | .................. | G01B 5/0016 33/1 M |
| 5,131,166 A | 7/1992 | Weber | | |
| 5,789,890 A * | 8/1998 | Genov | ................... | B25J 9/1615 318/567 |
| 6,037,733 A * | 3/2000 | Genov | ................... | B25J 9/1615 318/568.11 |
| 6,354,167 B1 | 3/2002 | Snow | | |
| 6,471,504 B1 * | 10/2002 | Matsui | ..................... | B25J 9/046 414/728 |
| 9,222,763 B2 * | 12/2015 | Singh | ..................... | G01B 5/008 |
| 9,541,371 B2 | 1/2017 | Petterson et al. | | |
| 9,746,304 B2 * | 8/2017 | Bridges | ................. | G01B 5/008 |
| 2005/0196483 A1 * | 9/2005 | Kinoshita | ............... | B29C 45/42 425/444 |
| 2007/0020082 A1 | 1/2007 | Caveney et al. | | |
| 2011/0167657 A1 | 7/2011 | Eaton | | |
| 2015/0219452 A1 * | 8/2015 | Bridges | ................ | G01B 21/042 33/503 |
| 2015/0345926 A1 * | 12/2015 | Bridges | ................. | G01B 11/24 33/502 |
| 2018/0149473 A1 * | 5/2018 | Sprenger | ............. | G01B 21/045 |

FOREIGN PATENT DOCUMENTS

| | | |
|---|---|---|
| CN | 104380034 A | 5/2015 |
| EP | 0 418 203 A1 | 3/1991 |
| JP | H6-241766 A | 9/1994 |

* cited by examiner

| | Output | Passing on | Input |
|---|---|---|---|
| | Follower pulley | Follower pulleys | Base pulley |
| Probe guiding | Rotatable follower pulley | Forwarding follower pulley | Fixed base pulley |
| | | "Fixed" follower pulley | |
| Probe/carrier motorizing | Rotatable follower pulley | Forwarding follower pulley | Driven base pulley |
| | | "Driven" follower pulley | |
| Carrier pivoting | Fixed follower pulley | Forwarding follower pulley | Driven base pulley |
| | | "Driven" follower pulley | |

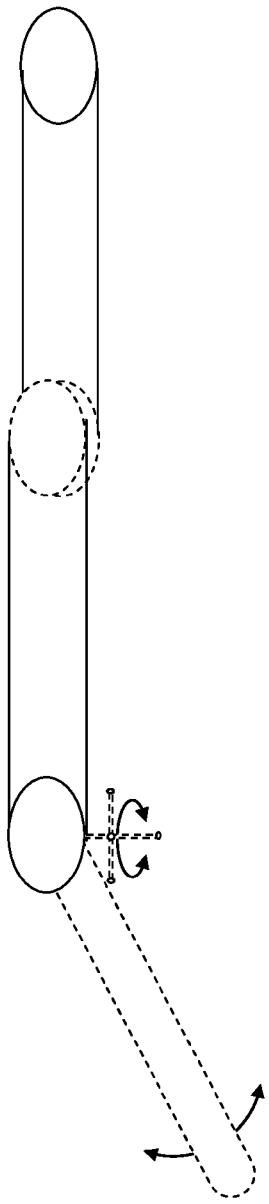

Fig. 4

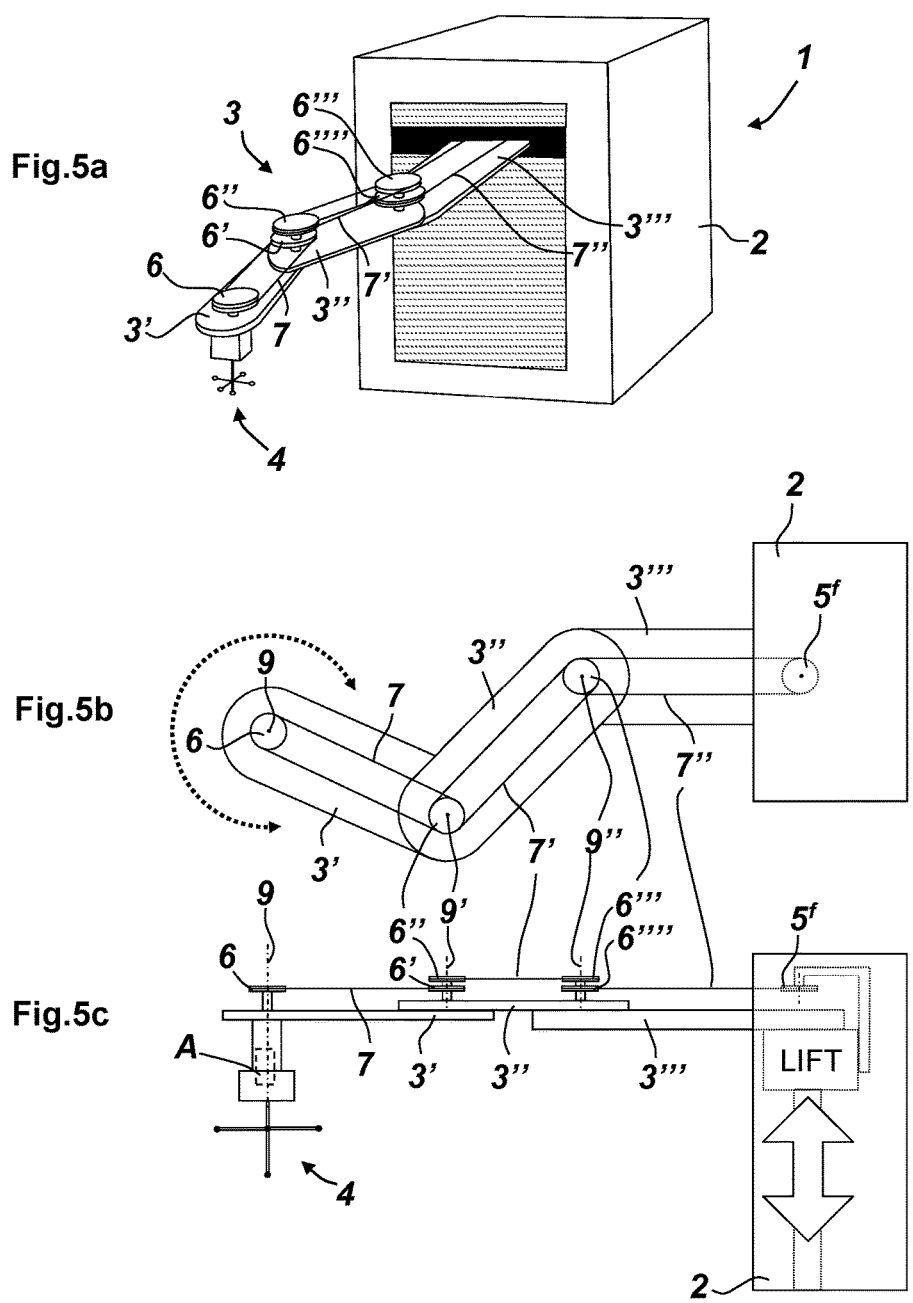

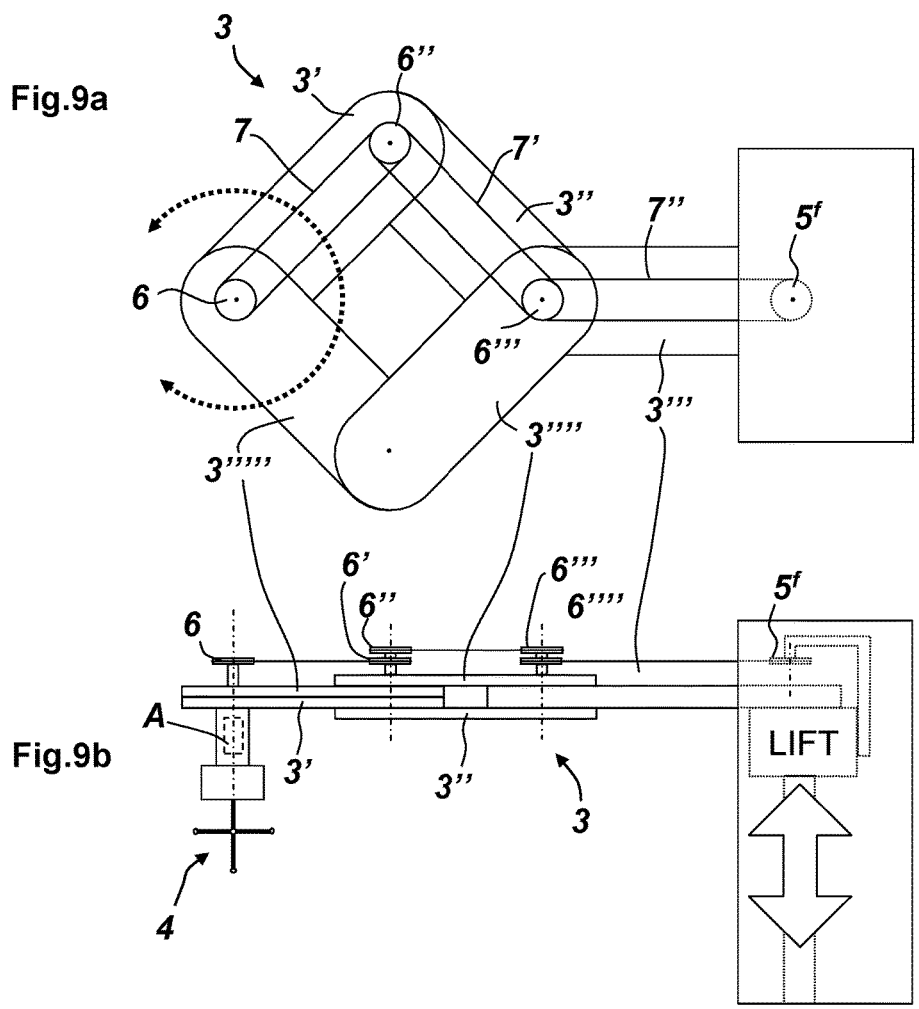

SCARA STRUCTURED COORDINATE MEASURING MACHINE WITH BELT DRIVE GUIDED PROBE HEAD

FIELD

This invention relates to a coordinate measuring machine (CMM) comprising a SCARA structure and a probe head guided by a cable drive.

BACKGROUND

Horizontal swan-neck robots, also known as SCARA (Selective Compliance Robot Arm), are commonly used as manipulators for substrate transport or for assembly tasks. Usually, such manipulators have to carry quite heavy loads, and also, each of their axes usually need to be motorised, the motor often placed at the joints. As a consequence, the entire construction is heavy and therefore needs to be very stiff in order to support the load, as each axis contains its own motorisation and the payload effects at the end of the arm. This is the reason the known solutions are bulky and short.

The main disadvantage in applying the SCARA principle for measuring machines is its bulkiness, the limited probe accessibility, its equipment with motors along the arms, the resulting heaviness, its high moment of inertia, the heat generation, the limited accuracy resulting from said disadvantages as well as restricted dynamic behaviour.

The substrate transporting robot shown in US 2007/0020082 A1 presents a solution to shift the heavy motors of such arms into the pillar of the robot to avoid causing high momentum bearing on the arms.

The antenna testing robot known from U.S. Pat. No. 6,354,167 is inspired from arm-type drafting machines which are a solution known from the era prior to CAD software. Disclosed therein is a torque transmission for moving the probe placed at the end of the arm.

The present invention is based on an evolution of the stated SCARA technology while being carried over into the field of high precision coordinate measuring machines.

SUMMARY

Some embodiments of the invention provide an improved high precision coordinate measuring machine with an advantageous mass distribution, therefore with an improved dynamic behaviour as well as with an improved accuracy.

Some embodiments of the invention provide a high precision coordinate measuring machine with an improved accessibility of its deployed probe.

Some embodiments of the invention provide a high precision coordinate measuring machine with an improved heat management, therefore with an improved behaviour regarding thermal expansion, therefore with an improved accuracy.

Some embodiments of the invention relate to a coordinate-measuring machine (CMM) for determining at least one spatial coordinate of a measurement point on a measuring object, comprising a base, a carrier comprising at least one carrier segment, a proximal end of the carrier being mounted pivotably about a base axis in the base, a measuring probe being arranged on a distal end of the carrier, and an angle measuring system for determining pivot angles of the at least one carrier segment, and/or rotation angles of the measuring probe, wherein at least one belt drive comprising a base pulley being arranged in the base, at least one follower pulley being arranged on at least one carrier segment, and at least one belt binding the rotatory behaviour of said pulleys.

In one embodiment, the measuring probe may be fixedly connected with a follower pulley arranged on the distal end of the carrier, wherein the measuring probe and/or said follower pulley are rotatably mounted in the distal end of the carrier.

In another embodiment of the coordinate-measuring machine, at least one motor and a control unit for controlling the motor is arranged in the base, the motor driving a base pulley for a controlled positioning of the measuring probe or a carrier segment.

In a further embodiment, the base pulley may be a fixed base pulley which is fixed and prevented from rotating, and the at least one follower pulley may be a rotatable follower pulley which is rotatable relative to the carrier segment it is arranged on.

In another embodiment, the base pulley may be a driven base pulley which is driven by a motor, and the at least one follower pulley being a rotatable follower pulley which is rotatable relative to the carrier segment it is arranged on.

In a further embodiment of the inventive CMM, the base pulley may be a driven base pulley which is driven by a motor, and at least one follower pulley being a fixed follower pulley which is fixedly attached to the carrier segment it is arranged on.

In another embodiment, a belt may be wrapped around a base pulley and at least one follower pulley and thereby binding the rotatory behaviour of said follower pulleys.

In one embodiment, a belt may be wrapped around at least two follower pulleys and thereby binding the rotatory behaviour of said follower pulleys.

In a further embodiment, the carrier is vertically adjustable by a lift positioned in the base.

In yet another embodiment, the carrier has more than one carrier segments, which are horizontally pivotable relative to each other about vertical segment axes.

In a further embodiment, each of the at least one follower pulley is mounted on a carrier segment such that the axis of the follower pulley coincides with a segment axis.

In one embodiment of the inventive CMM, a follower pulley has an axis angled by 90 degrees relative to the axis of a pulley it is bound to via a belt.

In another embodiment, the measuring probe is vertically adjustable by a belt drive, wherein the axis of a distal follower pulley is angled relative to the base pulley, particularly angled by 90 degrees, and wherein the distal follower pulley has a pinion driving a gear rack, to which the measuring probe is attached.

In yet another embodiment, the measuring probe is vertically adjustable by a belt drive comprising at least two follower pulleys, that are entangled by a distal belt and the axes of which are angled relative to the base pulley, particularly angled by 90 degrees, wherein the measuring probe is linked to the distal belt, which therewith provides and up and down movement.

In a further embodiment, the measuring probe being mounted on a holder such that it is pivotable about a horizontal axis by a belt drive comprising at least two follower pulleys, the axes of which are angled relative to each other, and relative to the base pulley, particularly angled by 90 degrees.

Proposed is a belt-driven solution in which all motors are located in the base of the machine to reduce not only weight but also heat generation, as the reduction of heat influence is very critical for metrology applications. Furthermore, the SCARA-like CMM comprises a calculated belt drive composition allowing for several function especially required for respective application. The coordinate measuring machine according to the invention is adapted and optimised for the application in high precision metrology. Depending on the application, it can be used horizontally as well as vertically and it can easily be adapted in length by either scaling or extending the amount of components.

The arm (or in other words: carrier) of the CMM comprises at least one pivoted segment which is preferably mounted in the base. This first segment is rotatable around an axis within the base. Alternatively, the first segment is mounted on a holder flanged to the base, whereby said axis can be located inside or outside the base.

Optionally, the first segment—or the holder, respectively—is able to be lifted by a standard linear guide in the base. As this lift only has one degree of freedom, it does not have constructional restrictions regarding size and stiffness. Its length also easily can be extended to a whished length without any technical obstacles.

A base pulley is placed at a proximal end of the carrier and a follower pulley is placed at a distal end of the carrier. The base pulley can either be a driven, i.e. motorized, or a fixed pulley, dependent on the application, wherein a fixed pulley would be restricted from rotating.

The base pulley has a centre point or axis, respectively, coinciding with the axis for pivoting the first carrier segment. Said pulleys are entangled by a belt, particularly a cable, and therewith, the rotation of the pulley is linked.

If applicable (driven base pulley), the motor for rotating the base pulley is located in the column (base). By doing so, the weight of the motor is located in the strong vertical axis. The driven base pulley can be used to either (i) pivot the first carrier segment, or (ii) to rotate a measuring probe or a second segment mounted on the end of the first segment, or (iii) to transmit the rotation to a measuring probe or a segment following the second or any further segment in a manner according to (i) or (ii).

(i) In case of using the driven base pulley for pivoting the first carrier, the follower pulley is fixed relative to the first segment. By the driven base pulley being rotated, a belt embracing the base pulley and the fixed follower pulley effects the first arm segment to pivot about the base axis.

(ii) In case of using the driven pulley for rotating a measuring probe mounted on the end of the first segment, the follower pulley is a freely rotatable follower pulley. Fixedly linked to said rotatable follower pulley is a measuring probe head, both or either of said components being mounted rotatably at the distal end of the first segment. In this way, the rotation of the driven base pulley transmits the rotation via a belt to the probe head, by using the freely rotatable follower pulley. Accordingly, the rotation of the driven pulley can be transmitted to a second carrier segment, which is mounted rotatably around an axis at the distal end of the first carrier segment, this axis also being the axis of said follower pulley. The follower pulley and the second segment being fixedly arranged relative to each other effects the second carrier segment to pivot around said axis of the follower pulley, when the driven base pulley is rotated.

(iii) As a "forwarder" extension of the system of which the carrier having at least two carrier segments, the follower pulley on the distal end of the first carrier segment (which is the proximal end of the second segment) is joined with a second follower pulley (e.g. over or under the first follower pulley), both follower pulley being freely rotatable relative to the first and the second carrier element and having the same rotation axis. The second follower pulley follows exactly the movement of the first (forwarding) follower pulley. The second segment, in this case, is pivotable about said distal end of said first segment via a pivot bearing, and the first segment is mounted in the base. The additional follower pulley "inherits" the features of the base pulley—that is to say in this case: if the base pulley is a driven base pulley (motorized), then, the additional follower pulley is also a "driven" follower pulley as the motion is carried on via the first follower pulley which acts as a "forwarder". In this way, the rotation of the driven base pulley is transmitted via a belt to a second carrier segment (or a further carrier segment, following the same principle). The motion forwarding can be provided also according to (i) (see above), when it is a second (or further) carrier segment that is to be driven; method (i), however, is of course not applicable, when it is a measuring probe that is to be driven. From a mechanical perspective, method (ii) is of more reasonableness and in summary, said second carrier segment, accordingly, further comprises a freely rotatable (final) follower pulley on its distal end, wherein this follower pulley can either be fixedly attached to:

a measuring probe head which is rotatable relative to said second segment and to be driven or guided by the base pulley, or a further (third) carrier arm segment, which is mounted in a way following the method disclosed above.

Either way, the pulley composition located at the rotation axis in the distal end of the first segment, then, is only there for forwarding the behaviour of the base pulley. This is realized by each pair of pulleys (base pulley—forwarding follower pulley/additional follower pulley—final follower pulley) being embraced and thereby linked by a belt.

In case the base pulley is a fixed pulley (fixed base pulley), this fixed condition concerning the rotation can be carried on, e.g. to a measuring probe. Here, again, two cases are to consider: A measuring probe being linked to the non-rotational behaviour of the fixed base pulley can either be arranged on the distal end of a first (and only) carrier arm segment, or on a further carrier arm segment which the carrier arm is extended by according to the method shown under (iii) above. In this extensional arrangement, an additional follower pulley, arranged right under or above the forwarding follower pulley, "inherits" the features of the base pulley—that is to say in this case: if the base pulley is a fixed base pulley (hindered from rotating), then, the additional follower pulley is also a "fixed" follower pulley as the alignment is carried on via the first follower pulley which acts as a "forwarder". In this way, the "rotation" (which is zero relative to a reference system of the base) of the fixed base pulley is transmitted via a belt to a measuring probe. This mechanism providing a stationary alignment of the measuring probe is particularly desirable in some measuring tasks, especially when having a cranked stylus.

A further belt drive can be implemented into the structure of a coordinate measuring machine according to the invention at the distal end of the carrier arm. The purpose of this further belt drive is the pivoting of a measuring probe about a horizontal axis. As all axes of the pulleys according to above described principle are vertical, there has to follow at least one transformational step in order to flip the axis of a pulley. By means of a further belt drive or another drive, like a gear drive, the rotational movement can be transmitted to the measuring probe.

Alternatively or additionally to the vertical linear axis in the base, by which the carrier arm can be adjusted in its height, a further vertical linear axis can be provided, e.g. at the distal end of the carrier arm so that a measuring probe can be adjusted in its height. With this vertical axis, drilled holes can be reached and measured more easily. This linear probe axis can be realized by using above described belt drive mechanism, wherein according pulleys' axes are redirected—if necessary: stepwise by 90 degrees—to transform the rotation in the needed direction, for eventually providing a linear movability in the vertical direction. Once the belt has the desired track (movement direction),

- the rotation of the pulley can be transmitted via a pinion onto a gear rack of the measuring probe head, or
- the measuring probe head can directly be attached to the belt and thereby follow its vertical translation immediately.

The downwards redirection of the belt can also be realised by two pulleys each having a horizontal axis which is perpendicular to the belt sides (slack and tight) coming from a pulley having a vertical rotational axis (e.g. a base pulley or a forwarder pulley on a carrier segment's pivot axis). These two redirection pulleys then are entangled by the belt sides about a quarter perimeter, forwarding the belt sides in a vertical direction where they entangle an output pulley, e.g. having a horizontal axis of rotation perpendicular to the axes of the redirection pulleys. This alternative downwards redirection can be used for the pivoting of a measuring probe or for the vertical linear axis.

Any of the above described mechanisms whatsoever are combinable with each other by adding the needed components and arrangement into the coordinate measuring machine.

BRIEF DESCRIPTION OF THE FIGURES

The method and the device according to the invention are described or explained in more detail below, purely by way of example, with reference to working examples shown schematically in the drawings. Specifically.

FIG. 1c is a side view of the CMM from FIG. 1a;

FIG. 2b is a side view of the CMM from FIG. 2a;

FIG. 3b is a side view of the CMM from FIG. 3a;

FIG. 4 is a synoptic table showing the three principles of manipulating the probe/carrier with means of a belt drive according to the invention;

FIG. 5a shows a further embodiment of a coordinate measuring machine (CMM) according to the invention;

FIG. 5b shows the movabilities of the CMM from FIG. 5a in a top view;

FIG. 5c is a side view of the CMM from FIG. 5a;

FIG. 6b is a side view of the CMM from FIG. 6a;

FIG. 7b is a side view of the CMM from FIG. 7a;

FIG. 8b is a side view of the CMM from FIG. 8a;

FIG. 9a shows the movabilities of a further embodiment of a CMM according to the invention in a top view;

FIG. 9b is a side view of the CMM from FIG. 9a;

FIG. 11b is a side view of the CMM from FIG. 11a;

FIG. 11c is a front view of the CMM from FIG. 11a;

FIG. 12b is a side view of the CMM from FIG. 12a;

FIG. 12c is a front view of the CMM from FIG. 12a;

DETAILED DESCRIPTION

Figure 1A:
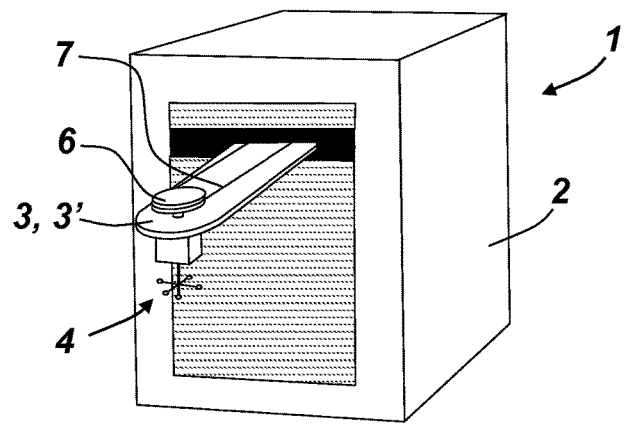
FIG. 1a shows an embodiment of a coordinate measuring machine (CMM) according to the invention.
Figure 1B:
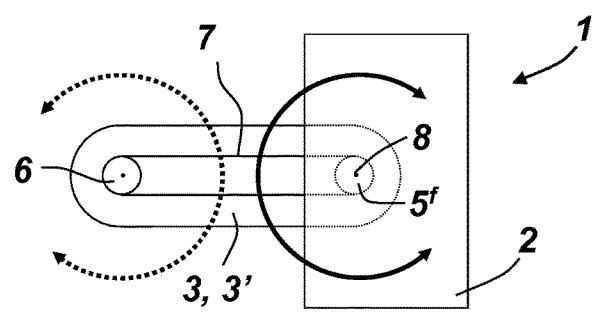
FIG. 1b shows the movabilities of the CMM from FIG. 1a in a top view.
Figure 1C:
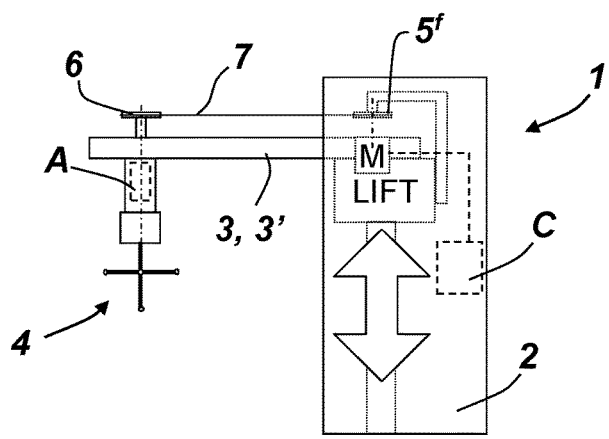

FIGS. 1a, 1b and 1c show an embodiment of a coordinate measuring machine (CMM) 1 according to the invention. The CMM comprises a base 2, a carrier 3 comprising at least one carrier segment 3', a proximal end of the carrier being mounted pivotably about a base axis 8 in the base 2, a measuring probe 4 being arranged on a distal end of the carrier, and an angle measuring system A for determining pivot angles of the at least one carrier segment. Furthermore, the CMM has a belt drive comprising a base pulley $5^f$ of which the axis coincides with the base axis 8, a follower pulley 6 being arranged on the carrier segment 3', and at least one belt 7 binding the rotatory behaviour of said pulleys.

FIG. 1a shows an embodiment of a CMM 1 according to the invention in a three dimensional perspective and with the carrier 3 only having one carrier arm segment 3'. The carrier segment 3' has a base pulley, which in this figure is hidden in the base 2, and a follower pulley 6, which is connected with a measuring probe 4 (internally with regard to shown parts), so that a rotation of the follower pulley 6 is directly transmitted to the measuring probe 4. The follower pulley 6 and the base pulley are embraced by a cable 7, so that this arrangement works like a belt drive. However, as FIGS. 1b and 1c will show, the base pulley is not driven and, hence, will not actively transmit any rotation onto follower pulley 6.

FIG. 1b shows the CMM 1 from FIG. 1a from a top view perspective. The circular arrows connote the respective pivoting/rotating which is possible with this embodiment. The solid line means, an active pivoting of the carrier segment 3' (by a motor not shown) around the base axis 8 is possible, and the dashed line means that the follower pulley (and therewith also the measuring probe) is passively rotating in the opposite direction of the carrier pivoting relative to the carrier segment. Base pulley $5^f$, in this embodiment, is a fixed base pulley $5^f$ and is therefore prevented from rotating relative to the base. Cable 7 now directly links the fixed base pulley $5^f$ with the follower pulley 6 and therefore restricts follower pulley 6 from rotating relative to the base, when the carrier 3 is pivoted about the base axis 8. This prevention from rotation, at the same time, means a rotation of follower pulley 6 relative to the carrier segment 3'. This effect ensures a constant alignment of the measuring probe, no matter what the orientation of the carrier.

FIG. 1c shows the CMM 1 from FIG. 1b from a side view perspective. This perspective further reveals the motor M, which directly drives the carrier segment 3', and a lift, by which the whole measuring arm arrangement can be adjusted in height. As depictured, fixed base pulley $5^f$ can be attached to the lift by a crane in order to follow the height adjustment. Also shown is the motor M and a control unit C for controlling the motor M that is arranged in the base 2, the motor m driving the fixed base pulley $5^f$ for a controlled positioning of the measuring probe 4 or a carrier segment 3'.

Figure 2A:
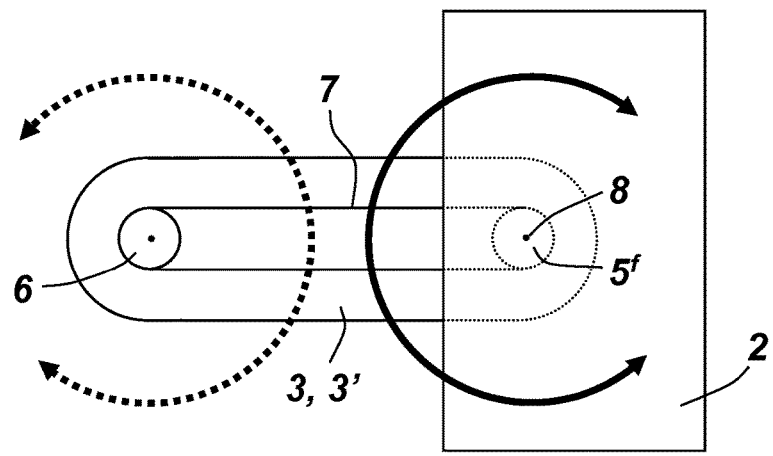
FIG. 2a shows the movabilities of a further embodiment of a CMM according to the invention in a top view.
Figure 2B:
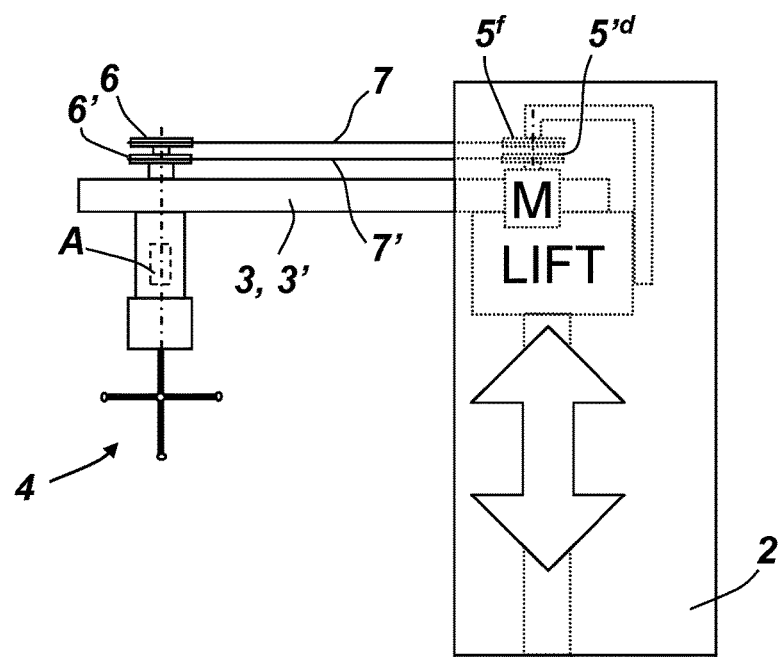

FIGS. 2a and 2b show a further embodiment of a coordinate measuring machine (CMM) 1 according to the invention. This embodiment differs from the embodiment shown in FIGS. 1a-c in that the CMM comprises two belt drives.

The first belt drive ($5^f$,6,7) ensures the constant alignment of measuring probe 4 according to the embodiment shown in FIGS. 1a-c. Follower pulley 6 is mounted in the carrier segment 3' such that is can rotate freely relative to it.

The second belt drive ($5'^d$,6',7') works independent from the first belt drive. The carrier segment 3', herewith, is driven in an unconventional way. A motor M drives the driven base pulley $5'^d$, but since follower pulley 6' is a fixed follower pulley restricted from rotating relative to carrier segment 3', driven base pulley $5'^d$ is also bound to the rotation of carrier segment 3' and also cannot rotate relative to it. The momentum causing the carrier segment 3' to pivot is generated at the follower pulley 6' and the tight side of the belt "pulling" on its perimeter surface.

Figure 3A:
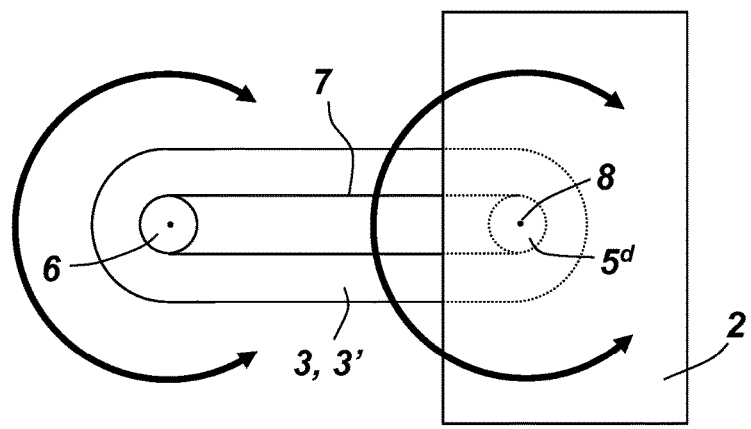
FIG. 3a shows the movabilities of a further embodiment of a CMM according to the invention in a top view.
Figure 3B:
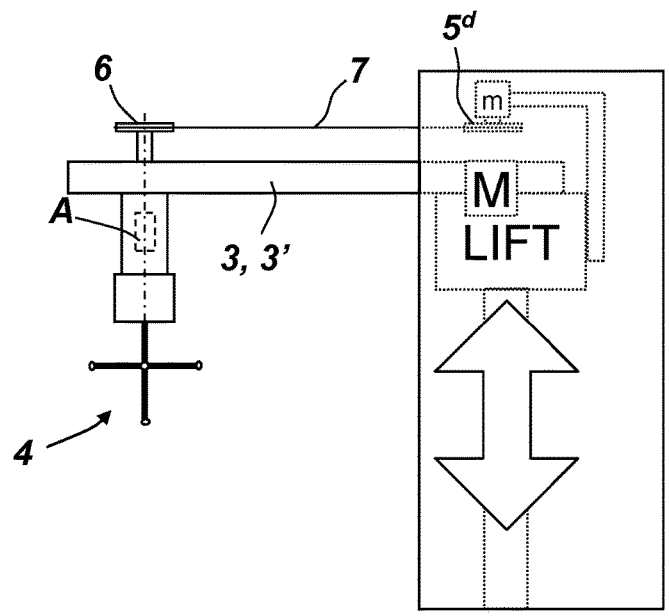

FIGS. 3a and 3b show a further embodiment of a coordinate measuring machine (CMM) 1 according to the invention. This embodiment differs from the embodiment shown in FIGS. 1a-c in that the follower pulley is actively and independently controllable via a motor m. In this embodiment, base pulley $5^d$ is a driven base pulley $5^d$ and the follower pulley 6 is a rotatable follower pulley. With motor m, therefore, the rotational behaviour of measuring probe 4 is controlled, independent from the movement or position of the carrier. Carrier segment 3' is pivotable with motor M. If motor m is blocked and prevents base pulley $5^d$ from rotating, the features of "guiding" the fixed alignment of the probe 4 according to the fixed base pulley, as shown in FIGS. 1a-c, are given.

FIG. 4 provides an overview of the three purposes of manipulating the probe/carrier with means of a belt drive according to the invention and how each manipulation is forwarded on a multi-segment carrier.

The base pulley (input) is considered to "determine" the follower pulley's conduct (output). Optionally, for forwarding (passing on) the input to the output, a follower pulley is provided, which preferentially can be a twin-pulley, for each additional carrier segment. In this case, input and output are not positioned on the same carrier segment and therefore need a redirection at the respective joint(s).

Probe guiding: According to the mechanism described with FIGS. 1a, 1b and 1c, "probe guiding" is the retention of the measuring probe's alignment, even if the carrier segment(s) are pivoted, with help of a "fixed" base pulley. Output (follower pulley), then, must be a rotatable follower pulley in order to "follow" (keep) a fixed alignment relative to a base reference system. In case the carrier comprises more than one segment, passing on is provided by a set of two pulleys, wherein the first pulley (forwarding follower pulley) is paired with the base pulley and the second pulley ("fixed" follower pulley) is paired with the follower pulley, the latter being connected to the probe. Preferably, said pairs are each entangled by a belt, and thereby bound to each other. The twin-pulley is a fixed arrangement, so that the forwarding follower pulley and the fixed follower pulley cannot rotate relative to each other. Furthermore, the twin-pulley is freely rotatably mounted in the carrier so that it can easily comply with the base pulley's alignment. As the twin-pulley is now following strictly the fixed base pulley's alignment, the fixed follower pulley earns its byname "fixed", as it has the same characteristics to the rotatable follower pulley, as has the fixed base pulley to the forwarding follower pulley. By this arrangement, a probe head always keeps a stationary alignment (with respect to the base), no matter which orientation the carrier segment(s) are adopting.

Probe/carrier motorizing: According to the mechanism described with FIGS. 3a and 3b, "probe/carrier motorizing" addresses the active and independent controlling of the measuring probe or a carrier segment with a belt drive comprising at least a driven base pulley (input) and a rotatable follower pulley (output). In case the carrier comprises more than one segment, passing on is provided by a set of two pulleys, wherein the first pulley (forwarding follower pulley) is paired with the base pulley and the second pulley ("driven" follower pulley) is paired with the follower pulley, the latter being connected to the probe or to a further carrier segment. The "driven" follower pulley earns its name as it inherits the features of the base pulley and therewith just forwards the rotation to the rotatable follower pulley.

Carrier pivoting: Above described (i) as well as the propulsion of the CMM in FIGS. 2a and 2b are a special case of "carrier pivoting", in which the output is a fixed follower pulley, which is fixed relative to the carrier segment which it is arranged on. The driven base pulley applies a momentum on the distal carrier segment with attempting to move the belt according to the base pulley. Such movement, however, is only possible, when the carrier segment pivots accordingly. Again, this principle is extendable by a twin-pulley as it was described under "probe/carrier motorizing".

The three shown principles are combinable so that multiple belt drives provide the desired movabilities (probe, single carrier segments). The following figures demonstrate isolated embodiments which are likewise combinable.

FIGS. 5a, 5b and 5c show an embodiment of a CMM according to the "probe guiding" principle in FIG. 4, the CMM's carrier 3 comprising three carrier segments 3', 3", 3''', which are pivotable relative to each other about vertical segment axes 9, 9', 9". Further, it comprises a fixed base pulley $5^f$, four follower pulleys 6', 6", 6''', 6'''' for passing on the fixed alignment and a rotatable follower pulley 6, to which the measuring probe 4 is coupled.

The dashed arrow around follower pulley 6 in FIG. 5b implies its linkage to fixed base pulley $5^f$ and that it will keep its alignment in every possible carrier segment position.

FIG. 5c shows the CMM in a side view. The belt drive comprises three parts:
  fixed base pulley $5^f$ and forwarding follower pulley 6'''' being embraced by cable 7",
  "fixed" follower pulley 6''' and forwarding follower pulley 6" being embraced by cable 7', and
  "fixed" follower pulley 6' and rotatable follower pulley 6 being embraced by cable 7.

Pulleys 6' and 6" on the one hand, as well as pulleys 6''' and 6'''' on the other hand, are linked fixedly, so that they cannot rotate relative to each other. However, they are rotatable around the vertical segment axes 9, 9' and 9", respectively, and are accordingly mounted in the carrier segments 3', 3" and 3"', respectively.

A drive for the single carrier segments is not yet provided with this embodiment. Drives for the single carrier segments shall be described in the following figures.

Figure 6A:
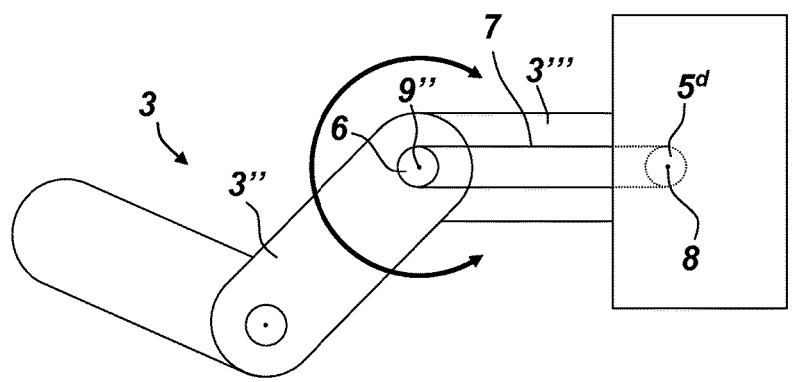
FIG. 6a shows the movabilities of a further embodiment of a CMM according to the invention in a top view.
Figure 6B:
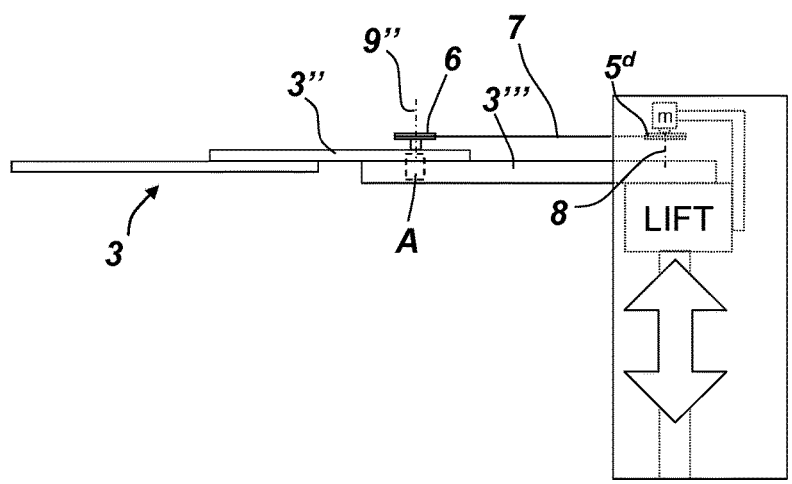

FIGS. 6a and 6b show an embodiment of the belt drive equipped CMM according to the invention, wherein a second (and, concomitant with it, a distal) carrier segment is driven by a motor m and by means of a driven base pulley $5^d$ and a rotatable follower pulley 6, according to the "probe/carrier motorizing" principle disclosed in FIG. 4, while said pulleys are entangled by belt 7. The solid line arrow indicates the turnability of carrier segment 3" around the segment axis 9"'. Rotatable follower pulley 6 is "rotatable" with regard to carrier segment 3"', however it is fixedly connected with carrier segment 3", so carrier segment 3" exactly follows the rotation of driven base pulley $5^d$.

Figure 7A:
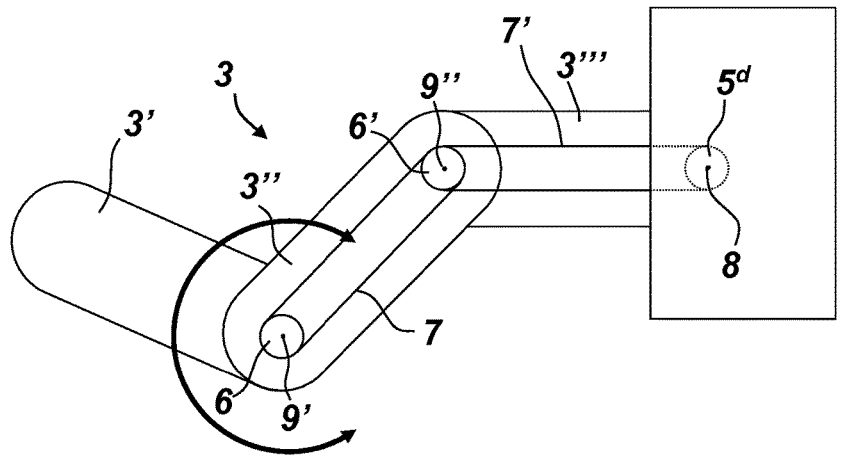
FIG. 7a shows the movabilities of a further embodiment of a CMM according to the invention in a top view.
Figure 7B:
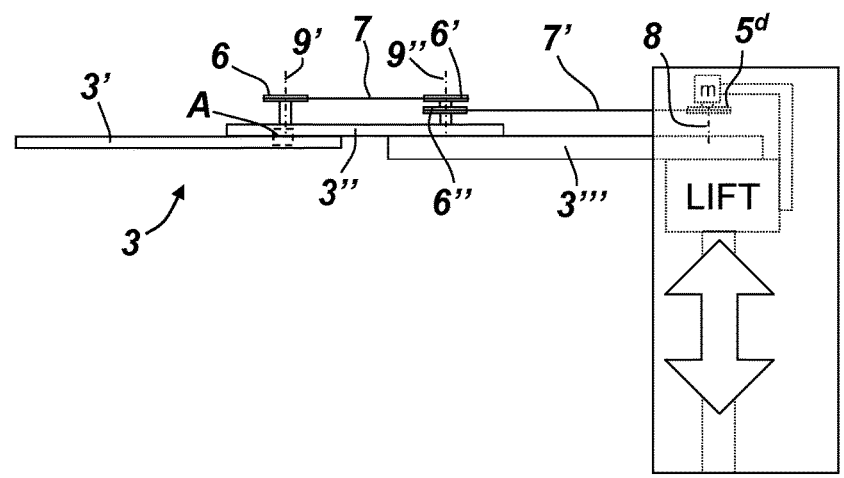

By the same principle, FIGS. 7a and 7b show the motorization of carrier segment 3', which is attached to follower pulley 6. The set of pulleys, comprising "driven" follower pulley 6' and forwarding follower pulley 6" (according FIG. 4's terminology), passes on the rotation of driven base pulley $5^d$ to rotatable follower pulley 6. Yet again, the solid arrow indicates the function of this belt drive.

Figure 8A:
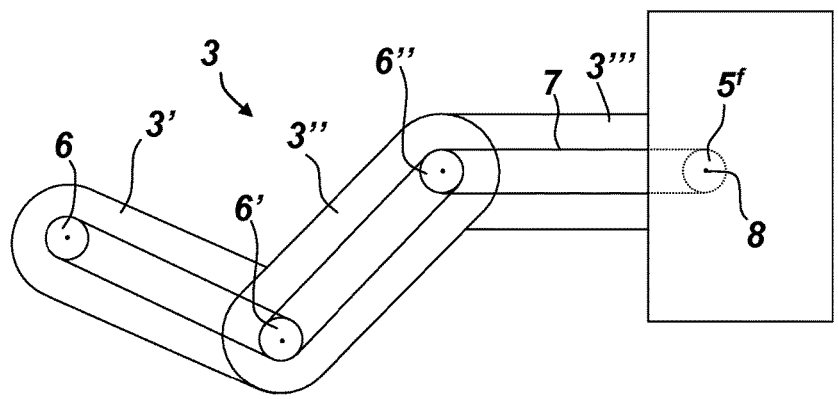
FIG. 8a shows the movabilities of a further embodiment of a CMM according to the invention in a top view.
Figure 8B:
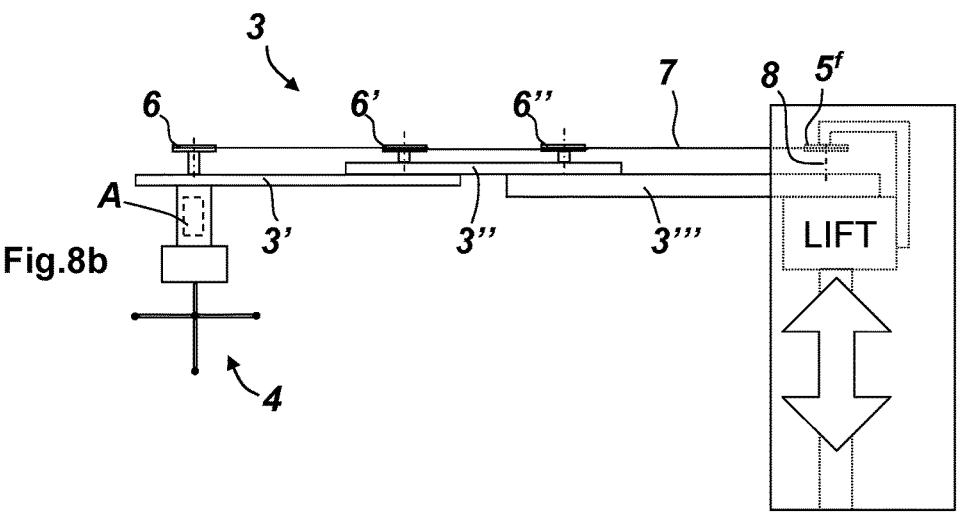

FIGS. 8a and 8b show a general alternative for having multiple pulleys at one axis for forwarding the pulley's rotation. In this embodiment, which is (due to the small rotation angle range) especially suitable for the "probe guiding" concept according to FIG. 4, the belt drive only comprises one belt (or cable, etc.) that is wrapped around the two forwarding pulleys in order to follow the track of the carrier arm segments. Both slack side and tight side of the belt are entangling the forwarder pulleys by 360°. To avoid high friction, the belt can follow spiral grooves applied on the pulleys' perimeters.

FIGS. 9a and 9b show another embodiment of the CMM according to the invention. Demonstrated is a double arm structure of the carrier while being designed to be equipped with any of the guiding/motorizing/pivoting arrangements as described above.

A drive for the double arm carrier is not yet provided with this embodiment. Applicable drives shall be described in the following figures.

Figure 10A:
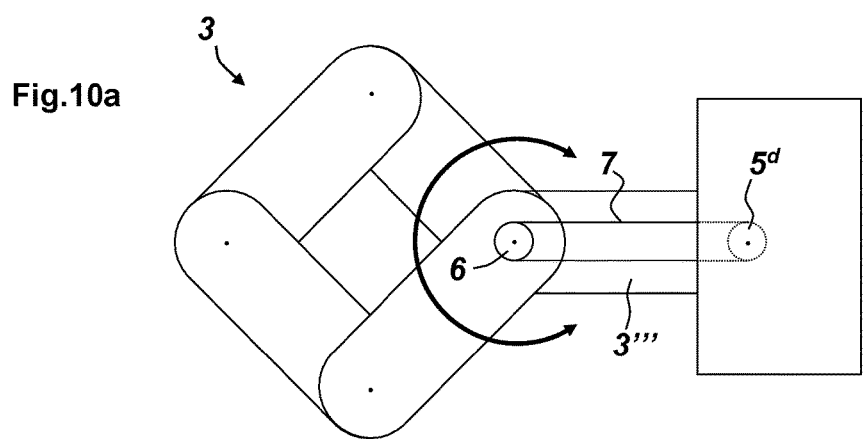
FIG. 10a shows the movabilities of a further embodiment of a CMM according to the invention in a top view.
Figure 10B:
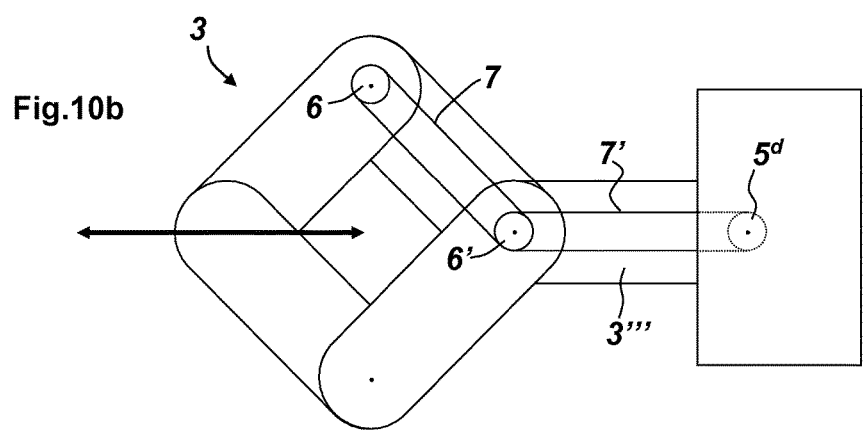
FIG. 10b shows the movabilities of a further embodiment of a CMM according to the invention in a top view.

FIGS. 10a and 10b each show a drive for the first and the second double arm while using the principle described under FIG. 6. Because both double arms are linked as shown, the drive demonstrated in FIG. 10b realizes a linear movement of the distal carrier end as indicated by the solid arrow line.

Figure 11A:
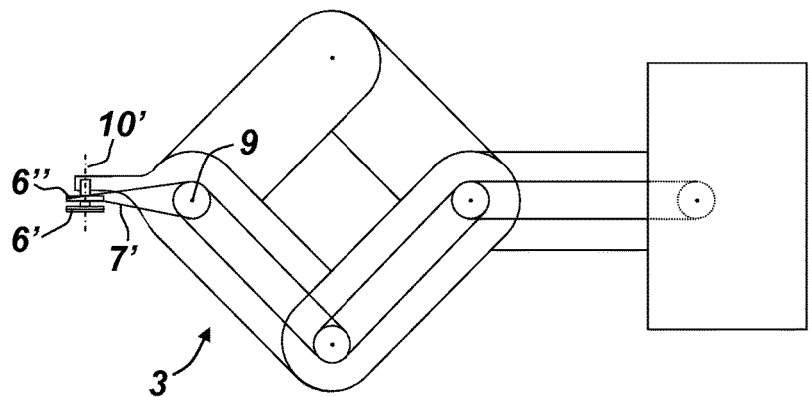
FIG. 11a shows a further embodiment of a CMM according to the invention in a top view.
Figure 11B:
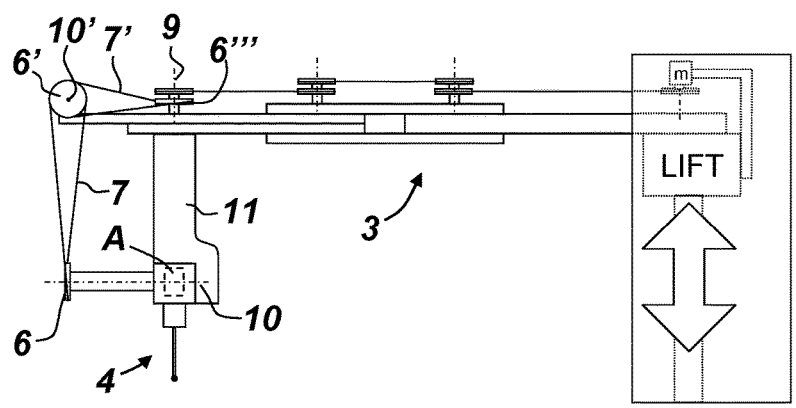
Figure 11C:
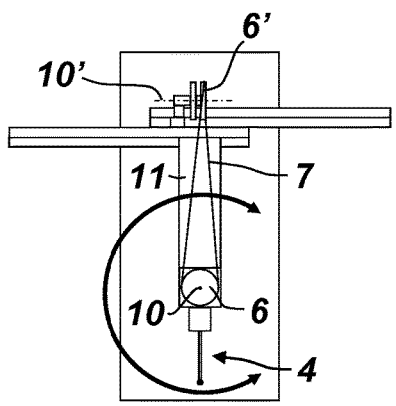

FIGS. 11a, 11b and 11c show another embodiment of the CMM according to the invention. Demonstrated is a redirection of the cable drive in order to provide the measuring probe 4 with a rotation-functionality with a horizontal axis 10. In FIG. 11c, further pulleys are not shown to simplify matters.

If circumstances require, like in this example, it might be necessary to have two axes redirections to provide said rotatability for the measuring probe. Alternatively or additionally, a gear transmission can fulfil the same axis tilting.

At first, follower pulley 6"' passes rotation on to follower pulley 6" of which the rotation axis 10' is horizontal and tilted by 90° with respect to the vertical segment axis 9. Follower pulley 6' fixedly connected with follower pulley 6"' then passes rotation on to follower pulley 6 of which the rotation axis 10 is horizontal and tilted by 90° with respect to the horizontal axis 10'. Pulley 6 directly drives measuring probe 4, which is mounted in a holder 11, the holder being attached to the carrier.

Figure 12A:
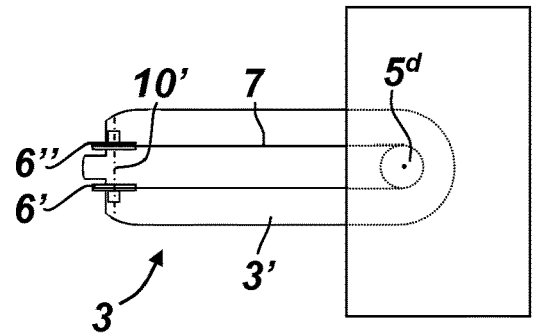
FIG. 12a shows a further embodiment of a CMM according to the invention in a top view.
Figure 12B:
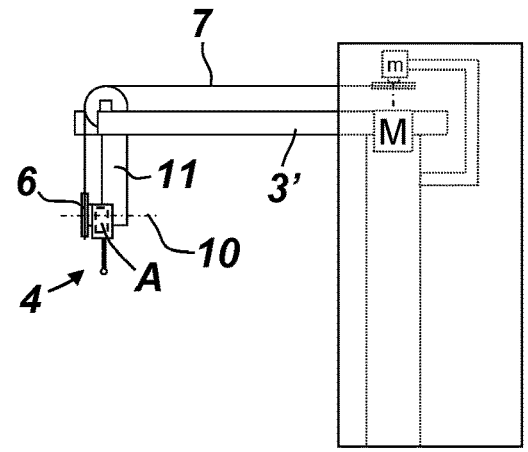
Figure 12C:
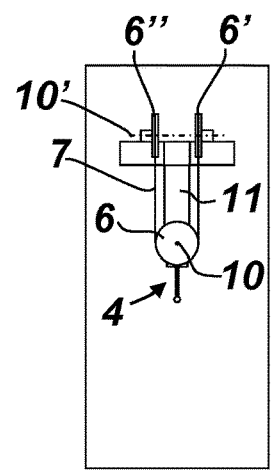

FIGS. 12a, 12b and 12c show another embodiment of the CMM according to the invention. Demonstrated is a redirection of the cable drive in order to provide the measuring probe 4 with a rotation-functionality around a horizontal axis 10, while using only a single cable 7.

In this example, the deflection is provided in a different way than in FIGS. 11a-c. Each tight side and slack side of belt 7 lead to a horizontally rotatable (about axis 10') pulley (6' and 6") by which belt 7 then is redirected "downwards" to pulley 6. No matter how base pulley $5^d$ is rotating, pulleys 6' and 6" will always rotate in an opposite direction. Follower pulley 6 is rotatably mounted in carrier 11 and therewith connected with carrier segment 3'. Pulley 6 provides rotation about horizontal axis 10 for measuring probe 4.

Figure 13:
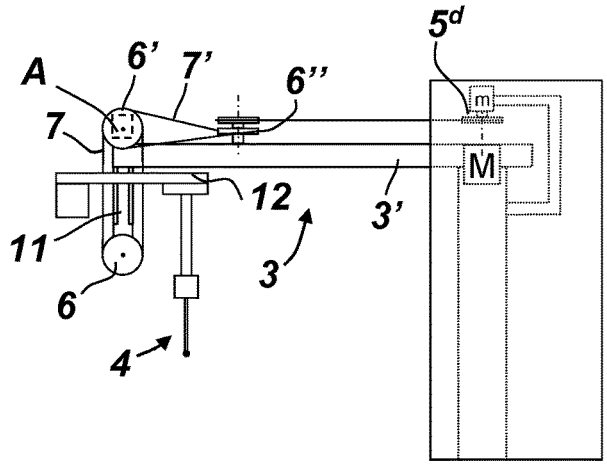
FIG. 13 is a side view of a further embodiment of a CMM according to the invention, providing a vertical measuring probe adjustability.
Figure 14:
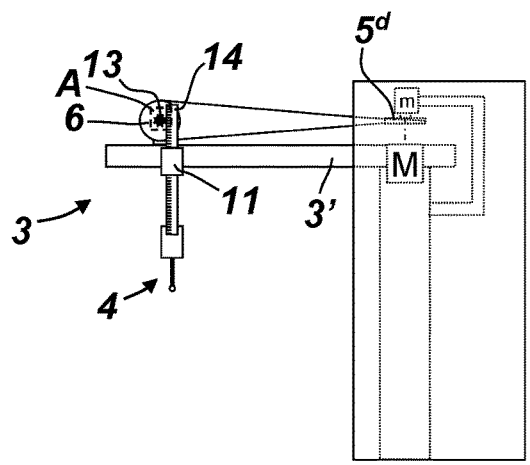
FIG. 14 is a side view of a further embodiment of a CMM according to the invention, providing a vertical measuring probe adjustability.

FIGS. 13 and 14 show two alternative possibilities for providing a vertical hoist axis in the system, in particular, providing it for the measuring probe in order to reach surfaces in a bore hole. Both examples are also equipped with a direct motor M to drive the carrier 3 (which only has one carrier element 3'), and a motor m for adjusting the height of the measuring probe 4. The hoist axis is not necessarily a substitute for the lift, but can also be used additionally.

In FIG. 13, follower pulley 6" redirects rotation to pulley 6' as introduced in FIGS. 11a-c, and height adjustment is realized by holder 12 being mounted on holder 11 while being directly carried upwards and downwards with means of cable 7. For this purpose, one side of the cable 7 and holder 12 can be linked and the other side of the cable 7 just passes through holder 12.

FIG. 14 shows an alternative for the probe hoist axis, wherein rotation of the follower pulley 6 is directly converted into a translation via pinion 13 and gear rack 14. The gear rack 14 is mounted in the holder 11, and pinion 13 is fixedly attached to pulley 6 and shares the rotation axis of the pulley 6. Furthermore, the redirection of the pulley axes takes place already between driven base pulley $5^d$ and follower pulley 6.

Figure 15:
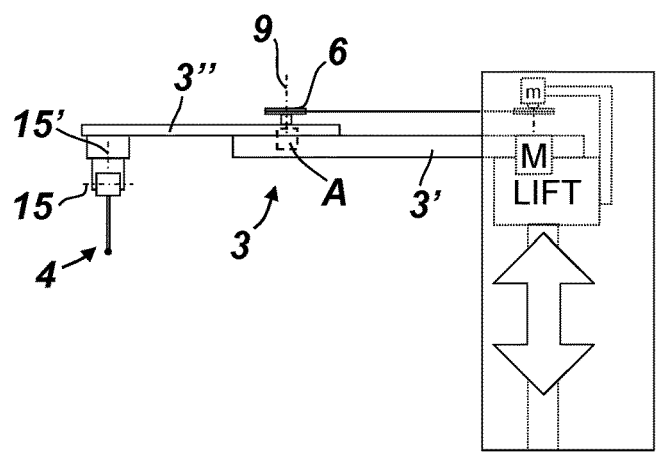
FIG. 15 is a side view of a further embodiment of a CMM according to the invention, providing a tilt-turn measuring probe head.

FIG. 15 shows an embodiment of the inventive CMM comprising a measuring probe head which provides two further degrees of freedom independently (tilt-turn functionality). Measuring probe 4 can be rotated about a vertical axis 15' and a horizontal axis 15 by means of light weight micro motors (not shown). Pulley 6 is controlled by a motor m and provides rotation of carrier segment 3" around axis 9, and carrier segment 3' is provided rotation by motor M. The measuring probe head is standard equipment and can be modularly attached to carrier 3 (e.g. at a "dock"), whereby connectivity regarding control and power supply is provided at the docking mount.

All shown embodiments may comprise an angle measuring system and/or a linear length measuring system for every carrier segment and/or measuring probe that is adjustable. All of the above described embodiments whatsoever are combinable with each other by adding the needed components and arrangement into the coordinate measuring machine.

What is claimed is:

1. A coordinate-measuring machine having a Selective Compliance Robot Arm (SCARA)-structure, configured for determining at least one spatial coordinate of a measurement point on a measuring object, coordinate-measuring machine comprising:
   a base;
   a carrier comprising more than one carrier segment, which are horizontally pivotable relative to each other about vertical segment axes, a proximal end of the carrier being mounted pivotably about a vertical base axis in the base;

a measuring probe being arranged on a distal end of the carrier;

an angle measuring system for determining:
pivot angles of the carrier segments,
at least one belt drive comprising:
a base pulley being arranged in the base, wherein the axis of the base pulley coincides with the base axis,
at least one follower pulley being arranged on at least one of the carrier segments, wherein one follower pulley is fixedly connected to one of the carrier segments,
at least one belt binding the rotary behaviour of the base pulley and the at least one follower pulley,
at least one motor arranged in the base and driving the base pulley for a controlled positioning of the measuring probe or one of the carrier segments, and
a control unit for controlling the motor.

2. The coordinate-measuring machine according to claim 1, wherein:
the measuring probe being fixedly connected with a follower pulley arranged on the distal end of the carrier, wherein the measuring probe is rotatably mounted in the distal end of the carrier.

3. The coordinate-measuring machine according to claim 1, wherein:
one of the at least one follower pulley is rotatably mounted in the distal end of the carrier.

4. The coordinate-measuring machine according to claim 1, wherein:
the base pulley being a fixed base pulley which is fixed and prevented from rotating, and
the at least one follower pulley being a rotatable follower pulley which is rotatable relative to the carrier segment it is arranged on.

5. The coordinate-measuring machine according to claim 1, wherein:
the base pulley being a driven base pulley which is driven by one of the at least one motor.

6. The coordinate-measuring machine according to claim 1, wherein:
the at least one follower pulley being a rotatable follower pulley which is rotatable relative to the carrier segment it is arranged on.

7. The coordinate-measuring machine according to claim 1, wherein:
at least one follower pulley being a fixed follower pulley which is fixedly attached to the carrier segment it is arranged on.

8. The coordinate-measuring machine according to claim 1, wherein:
one of the at least one belt being wrapped around one of the at least one base pulley and at least one follower pulley and thereby binding the rotary behaviour of the base pulley and the at least one follower pulley.

9. The coordinate-measuring machine according to claim 1, wherein:
one of the at least one belt being wrapped around at least two follower pulleys and thereby binding the rotatory behaviour of the at least two follower pulleys.

10. The coordinate-measuring machine according to claim 1, wherein:
the carrier is vertically adjustable by a lift positioned in the base.

11. The coordinate measuring machine according to claim 1, wherein:
each of the at least one follower pulley is mounted on one of the carrier segments such that the axis of the follower pulley coincides with a segment axis.

12. The coordinate measuring machine according to claim 1, wherein:
one of the at least one follower pulley having an axis angled by 90 degrees relative to the axis of a pulley it is bound to via one of the at least one belt.

13. The coordinate-measuring machine according to claim 1, wherein:
the measuring probe is vertically adjustable by one of the at least one belt drive, wherein the axis of a distal follower pulley is angled relative to the base pulley, and wherein the distal follower pulley has a pinion driving a gear rack, to which the measuring probe is attached.

14. The coordinate-measuring machine according to claim 1, wherein:
the measuring probe is vertically adjustable by one of the at least one belt drive, wherein the axis of a distal follower pulley is angled 90 degrees relative to the base pulley, and wherein the distal follower pulley has a pinion driving a gear rack, to which the measuring probe is attached.

15. The coordinate-measuring machine according to claim 1, wherein:
the measuring probe is vertically adjustable by one of the at least one belt drive comprising at least two follower pulleys, that are entangled by a distal belt and the axes of which are angled relative to the base pulley, wherein the measuring probe is linked to the distal belt, which therewith provides and up and down movement.

16. The coordinate measuring machine according to claim 1, wherein:
the measuring probe is vertically adjustable by one of the at least one belt drive comprising at least two follower pulleys, that are entangled by a distal belt and the axes of which are angled by 90 degrees relative to the base pulley, wherein the measuring probe is linked to the distal belt, which therewith provides and up and down movement.

17. The coordinate measuring machine according to claim 1, wherein:
the measuring probe being mounted on a holder such that it is pivotable about a horizontal axis by a belt drive comprising at least two follower pulleys, the axes of which are angled
relative to each other, and
relative to the base pulley.

* * * * *